(12) United States Patent
Stratton, Jr.

(10) Patent No.: US 8,424,981 B1
(45) Date of Patent: Apr. 23, 2013

(54) TRACTOR TRACTION SYSTEM

(76) Inventor: John Lawrence Stratton, Jr., Spartanburg, SC (US)

( * ) Notice: Subject to any disclaimer, the term of this patent is extended or adjusted under 35 U.S.C. 154(b) by 347 days.

(21) Appl. No.: 12/848,678

(22) Filed: Aug. 2, 2010

(51) Int. Cl.
*B62D 55/28* (2006.01)

(52) U.S. Cl.
USPC .......................................... 305/191; 305/187

(58) Field of Classification Search ............... 305/101, 305/111, 112, 114, 160, 161, 180, 185, 51, 305/187, 191, 192, 60, 46, 189, 53, 159, 305/198, 200, 201; 152/167, 170, 178, 179, 152/180, 182, 183, 185, 187, 208, 213 R, 152/216, 225 R, 226, 227, 225 C; 301/43, 301/44.1, 45, 46, 41.1
See application file for complete search history.

(56) References Cited

U.S. PATENT DOCUMENTS

| | | | |
|---|---|---|---|
| 1,395,134 A * | 10/1921 | Messner | 301/44.1 |
| 1,594,502 A | 2/1955 | Elzey | |
| 2,701,169 A | 2/1955 | Cannon | |
| 2,869,932 A * | 1/1959 | Eichweber | 305/51 |
| 2,954,086 A | 9/1960 | Butman | |
| 2,967,737 A | 1/1961 | Moore | |
| 3,291,180 A * | 12/1966 | Gellman | 152/225 C |
| 3,883,190 A * | 5/1975 | Kilbane, Jr. | 305/180 |
| 3,891,341 A | 6/1975 | Trainor et al. | |
| 4,027,925 A * | 6/1977 | Black et al. | 305/46 |
| 4,068,905 A * | 1/1978 | Black et al. | 305/51 |
| 4,109,971 A * | 8/1978 | Black et al. | 305/51 |
| 4,597,612 A * | 7/1986 | Kaizaki | 305/51 |
| 4,637,665 A | 1/1987 | Burdick et al. | |
| 4,865,400 A | 9/1989 | Caron et al. | |
| 5,569,340 A * | 10/1996 | Ulrich | 152/225 C |
| 5,685,616 A | 11/1997 | Burns | |
| D417,176 S | 11/1999 | Esaias et al. | |
| 7,198,333 B1 | 4/2007 | Freeman | |

FOREIGN PATENT DOCUMENTS

| | | | | |
|---|---|---|---|---|
| GB | 2242232 | A | * | 9/1991 |
| JP | 10016836 | A | * | 1/1998 |
| JP | 10297556 | A | * | 11/1998 |
| JP | 2000233777 | A | * | 8/2000 |
| JP | 2002264855 | A | * | 9/2002 |
| JP | 2003118661 | A | * | 4/2003 |
| JP | 2005263090 | A | * | 9/2005 |

* cited by examiner

*Primary Examiner* — Kip T Kotter
(74) *Attorney, Agent, or Firm* — Kyle Fletcher

(57) ABSTRACT

The additional traction accessory for use with a continuous track includes a U-shaped member in which one side is more elevated than the opposing side. The U-shaped member has an overall length greater than the overall width of the continuous track that the accessory is installed upon. The accessory acts as a larger cleat when compared to a cleat of a stuck continuous track. A first embodiment employs a pair of hooks and a ratcheting means that are designed to attach the accessory onto the continuous track between two cleats on a temporary basis in order to improve the traction of a continuous track by the addition of a larger cleat onto a continuous track that is stuck in a muddy area or area having loose soil. A second embodiment employs a slideable hook that locks at different lengths via bolting means to accommodate different continuous track widths.

6 Claims, 11 Drawing Sheets

TRACTOR TRACTION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of continuous tracks that are often seen on heavy machinery, more specifically, an accessory that attaches onto a continuous track to provide additional traction when said continuous track is stuck or bogged down.

A continuous track is comprised of a plurality of rigid units that are joined to each other to form a continuous loop that rotates to propel the machinery or vehicle. The tracks distribute weight over a larger surface as opposed to a wheel or a plurality of wheels. By increasing the surface to which weight is distributed, increased traction is provided as well as to aid in the prevention of sinking that is associated with mud or areas of loose soil.

However, no track is perfect, and can still get stuck in areas having especially thick mud. That being the case, an accessory(s) is(are) needed that can attach an enlarged cleat(s) onto one of the rigid units in between successive cleats of the continuous track to provide enhanced traction. The present invention seeks to overcome the limitations of the continuous track, and to provide an accessory that can be temporarily installed and used to give extra traction to the continuous track.

B. Discussion of the Prior Art

As will be discussed immediately below, no prior art discloses an accessory that attaches onto a continuous track, which increases traction to a continuous track that has lowered traction by adding a cleat that is higher and longer than the cleats of the continuous track; and wherein said accessory includes a ratcheting means to secure the accessory onto one of the rigid units via a pair of hooks or a slideable hook that locks via bolting means; and wherein the accessory can be removed once the continuous track requires no more increased traction; and wherein the accessory uses a U-shaped member having an overall length greater than the overall width of the continuous track in order to increase the traction efficiency of the accessory.

The Burns patent (U.S. Pat. No. 5,685,616) discloses a ground engaging surface for endless tracks and wheels. However, the segment is permanently affixed to the wheel or continuous track as opposed to an accessory that is added for temporary use in adding increased traction to a continuous track that is stuck.

The Burdick et al. patent (U.S. Pat. No. 4,637,665) discloses a track assembly for a track-type vehicle having a plurality of first and second distinct individual track shoes joined together to form an endless loop. However, the track shoes are permanently installed or affixed to the continuous track and is not an accessory that can be temporarily added onto one of the fixed units to add increased traction to a continuous track that is stuck or engaged in loose soil where increased traction is desired.

The Caron et al. patent (U.S. Pat. No. 4,865,400) discloses a demolition and compaction track shoe and assembly for crawler vehicle. Again, the track shoe is permanently affixed as a segment in the continuous track and not an accessory that is added onto an existing continuous track in order to increase the overall traction of the continuous track on a temporary basis.

The Moore patent (U.S. Pat. No. 2,967,737) discloses a detachable traction unit for an endless loop track. However, the detachable traction units are secured to segments of the continuous track via a spring-loaded cleat that requires adapting the continuous track and of which forms a handle-shaped traction unit thereon.

The Butman patent (U.S. Pat. No. 2,954,086) discloses a cultivator attachment for crawler tractors. However, the attachment is directed to cultivating and not adding increased traction to a stuck continuous track; and wherein the attachment does not use a U-shaped member and integrated ratching means to secure the accessory onto the continuous track.

The Cannon patent (U.S. Pat. No. 2,701,169) discloses a mud lug for endless traction track links. However, the mud lug uses elongated hooks to attach to a lug that is less than the overall width of the continuous track.

The Trainer et al. patent (U.S. Pat. No. 3,891,341) discloses a wear balanced cleat for a compaction wheel. However, the cleat is adapted for use on a wheel and not an accessory for increasing traction to a continuous track.

The Elzey patent (U.S. Pat. No. 1,594,502) discloses a traction plate for metal wheels and the like. However, the traction plate is bolted onto a wheel and is not adapted for use with a rigid unit of a continuous track; and is not temporarily attached onto said wheel via a ratcheing means.

The Freeman patent (U.S. Pat. No. 7,198,333) discloses a cleat for compacting refuse at a landfill by use on the wheels of a compactor or on the shoes of a crawler-type tractor. Again, the cleat is bolted onto a wheel and is not adapted for use with a rigid unit of a continuous track; and is not temporarily attached onto said wheel via a ratcheing means.

The Esias et al. patent (U.S. Pat. No. Des. 417,176) illustrates an ornamental design for a tractor tire cleat cover, which is not an accessory that attaches onto a continuous track.

While the above-described devices fulfill their respective and particular objects and requirements, they do not describe an accessory that attaches onto a continuous track, which increases traction to a continuous track that has lowered traction by adding a cleat that is higher and longer than the cleats of the continuous track; and wherein said accessory includes a ratcheting means to secure the accessory onto one of the rigid units via a pair of hooks or a slideable hook that locks via bolting means; and wherein the accessory can be removed once the continuous track requires no more increased traction; and wherein the accessory uses a U-shaped member having an overall length greater than the overall width of the continuous track in order to increase the traction efficiency of the accessory. In this regard, the additional traction accessory for use with a continuous track departs from the conventional concepts and designs of the prior art.

SUMMARY OF THE INVENTION

The additional traction accessory for use with a continuous track includes a U-shaped member in which one side is more elevated than the opposing side. The U-shaped member has an overall length greater than the overall width of the continuous track that the accessory is installed upon. The accessory acts as a larger cleat when compared to a cleat of a stuck continuous track. A first embodiment employs a pair of hooks and a ratcheting means that are designed to attach the accessory onto the continuous track between two cleats on a temporary basis in order to improve the traction of a continuous track by the addition of a larger cleat onto a continuous track that is stuck in a muddy area or area having loose soil. A second embodiment employs a slideable hook that locks at different lengths via bolting means to accommodate different continuous track widths.

It is an object of the invention to provide an accessory for a continuous track that temporarily increases the traction, of the continuous track by adding a cleat or grouser that is larger in width and in height to the cleat or grouser of the continuous track.

A further object of the invention is to provide a pair of hooks and a ratcheting means that enables the accessory to be easily installed and removed from one of the shoes or rigid units of the continuous track.

A further object of the invention is to provide a slideable hook that adjust in length to accommodate different continuous track widths and of which are locked to a defined length via bolting means.

A further object of the invention is to provide an accessory that can be attached to a single cleat of a continuous track or to include a plurality of said accessories that each attach to a cleat thereby adding increased traction to all cleats of said continuous track.

A further object of the invention is to provide varying styles of traction as opposed to a cleat and further include a rubber tread for use on smooth surfaces or teeth for use on frozen or slippery surfaces.

These together with additional objects, features and advantages of the additional traction accessory for use with a continuous track will be readily apparent to those of ordinary skill in the art upon reading the following detailed description of presently preferred, but nonetheless illustrative, embodiments of the additional traction accessory for use with a continuous track when taken in conjunction with the accompanying drawings.

In this respect, before explaining the current embodiments of the additional traction accessory for use with a continuous track in detail, it is to be understood that the additional traction accessory for use with a continuous track is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the additional traction accessory for use with a continuous track.

It is therefore important that the claims be regarded as including such equivalent construction insofar as they do not depart from the spirit and scope of the additional traction accessory for use with a continuous track. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
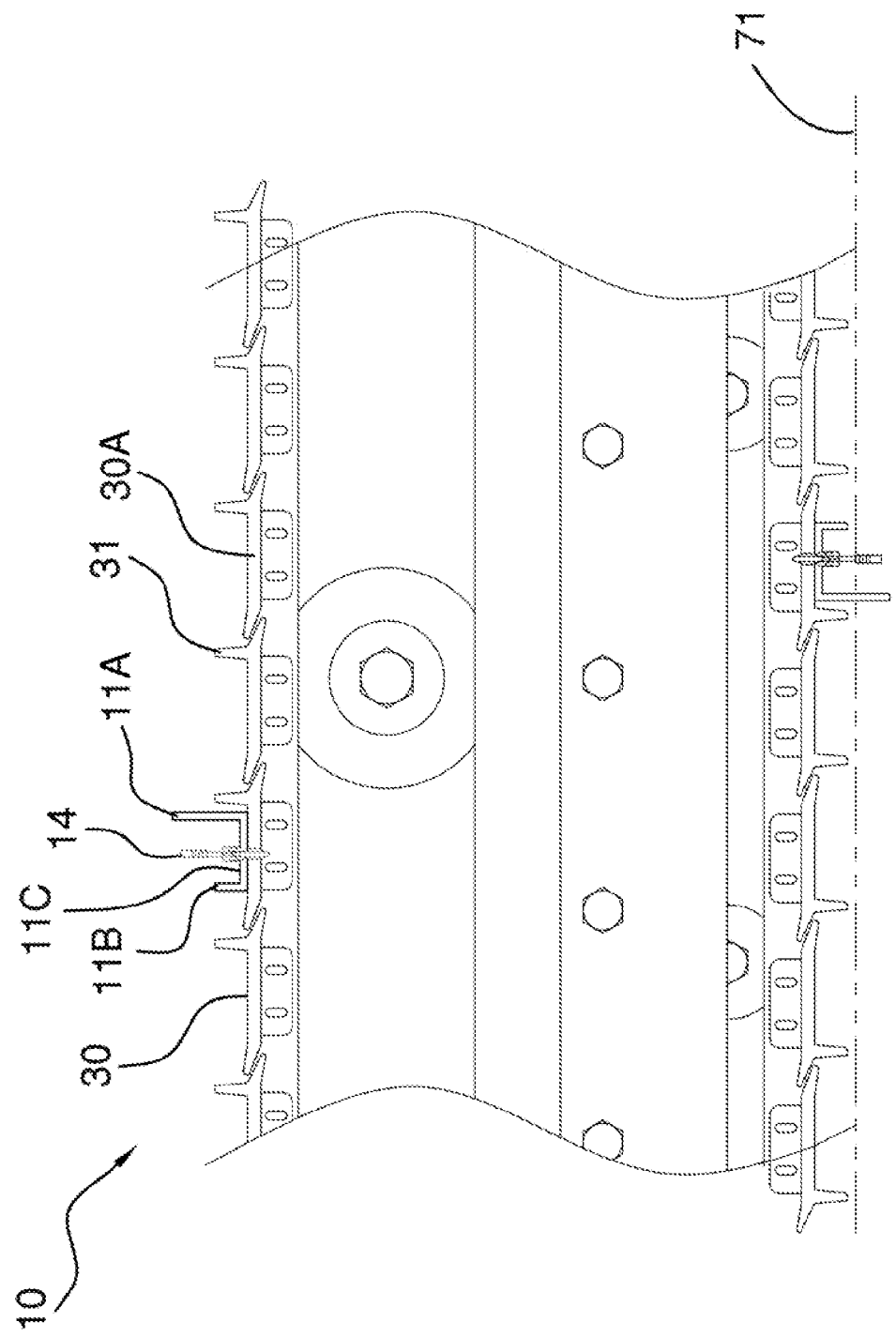
FIG. 1 illustrates a side view of the additional traction accessory for use with a continuous track attached onto each cleat of a continuous track and includes the ratcheting means and an elongated cleat.
Figure 2:
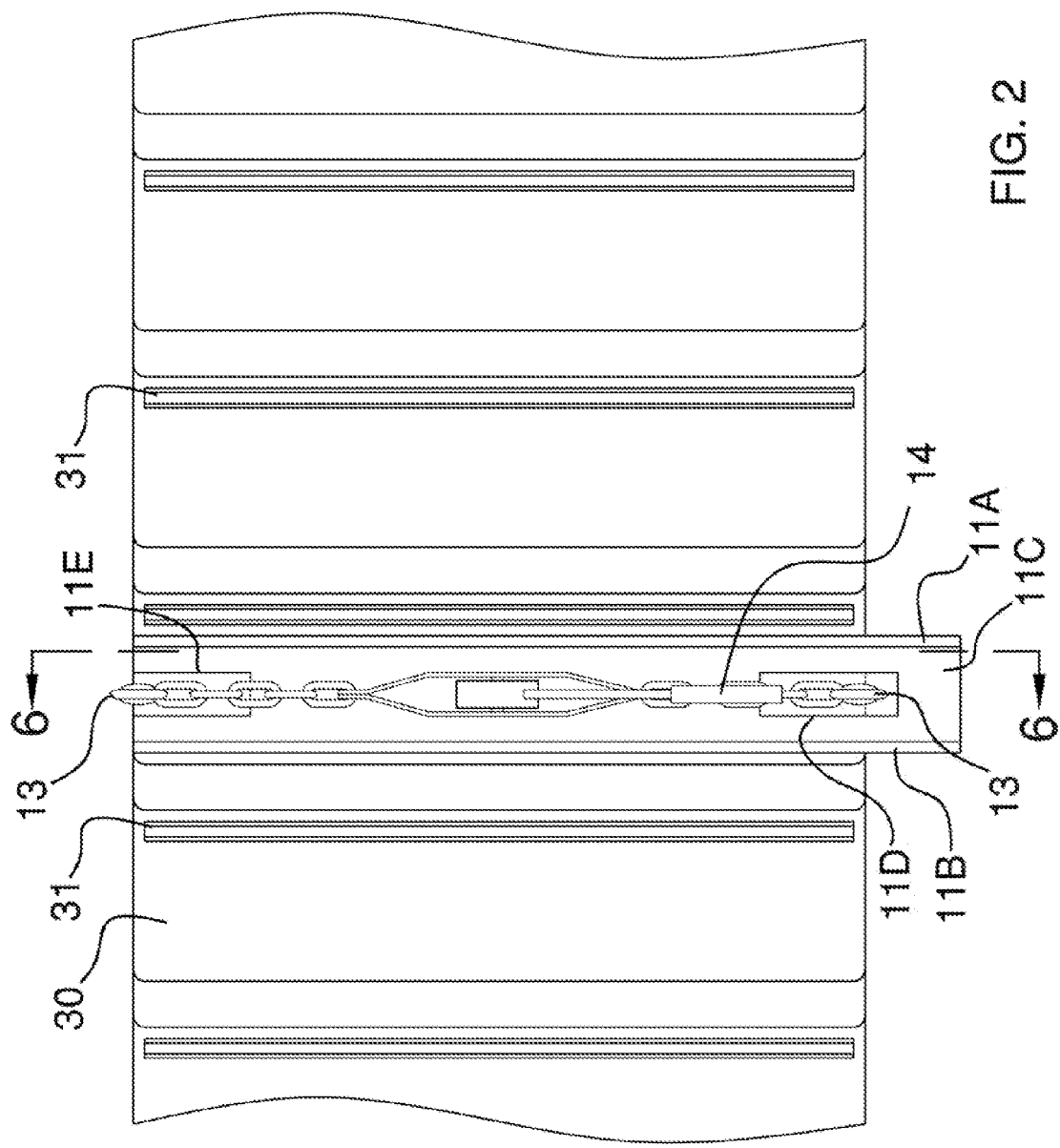
FIG. 2 illustrates a top view of the additional traction accessory for use with a continuous track attached onto a single cleat of the continuous track with the elongated cleat.
Figure 3:
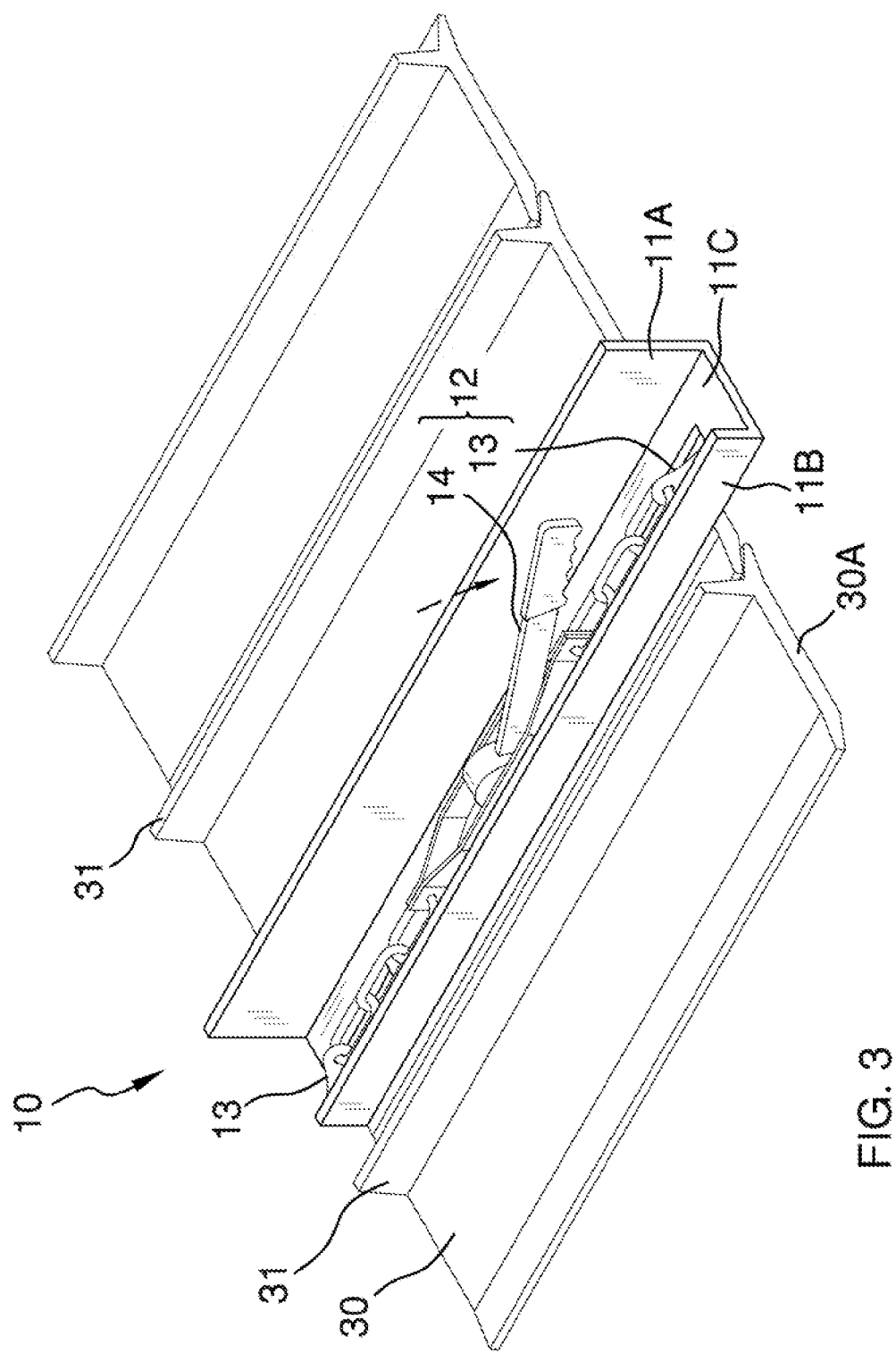
FIG. 3 illustrates an isometric view of the additional traction accessory for use with a continuous track and attached onto a single cleat of the continuous track and an arrow indicating rotation of the ratcheting means and featuring the elongated cleat.
Figure 4:
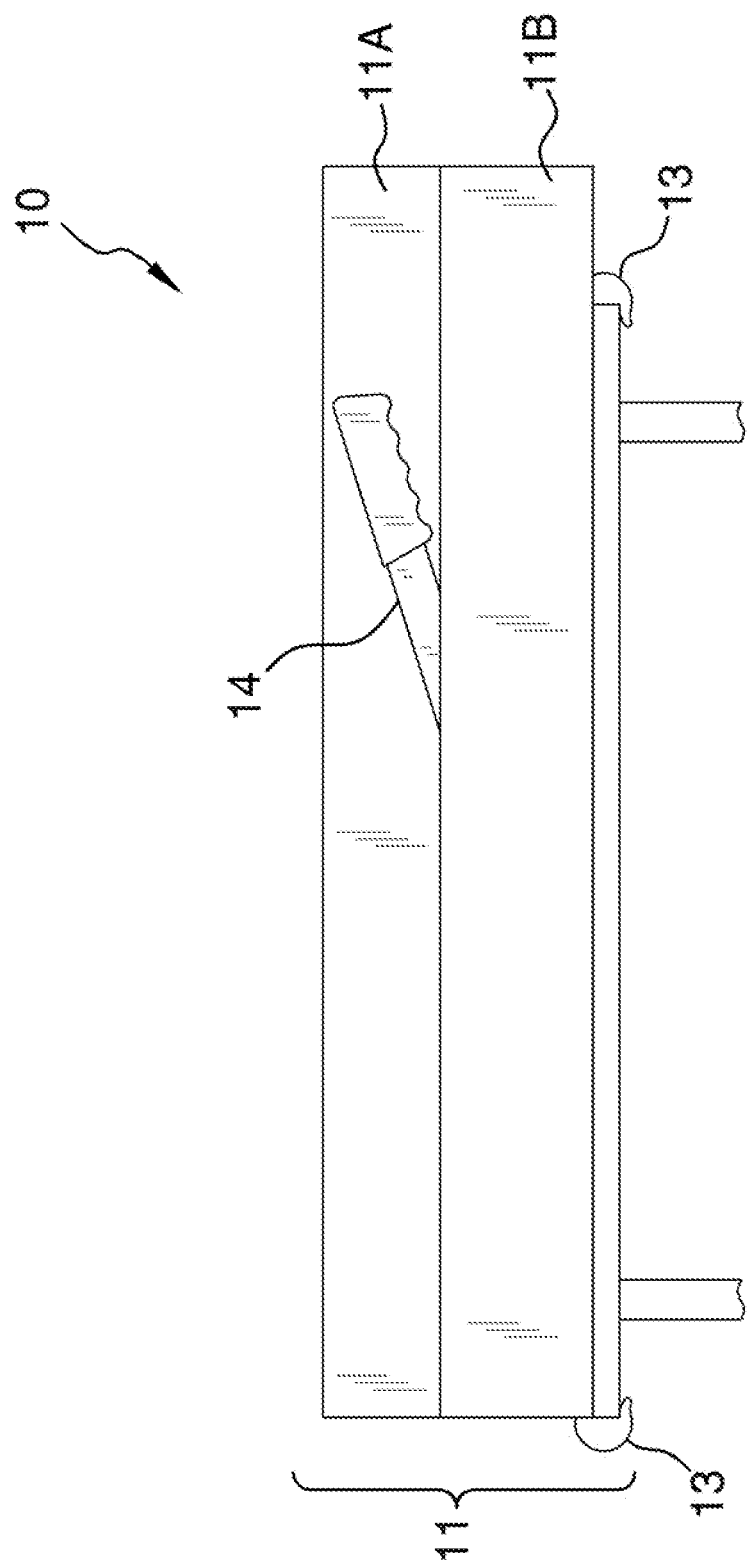
FIG. 4 illustrates an end view of the additional traction accessory for use with a continuous track and detailing the inter-relation of the hooks on the continuous track.
Figure 5:
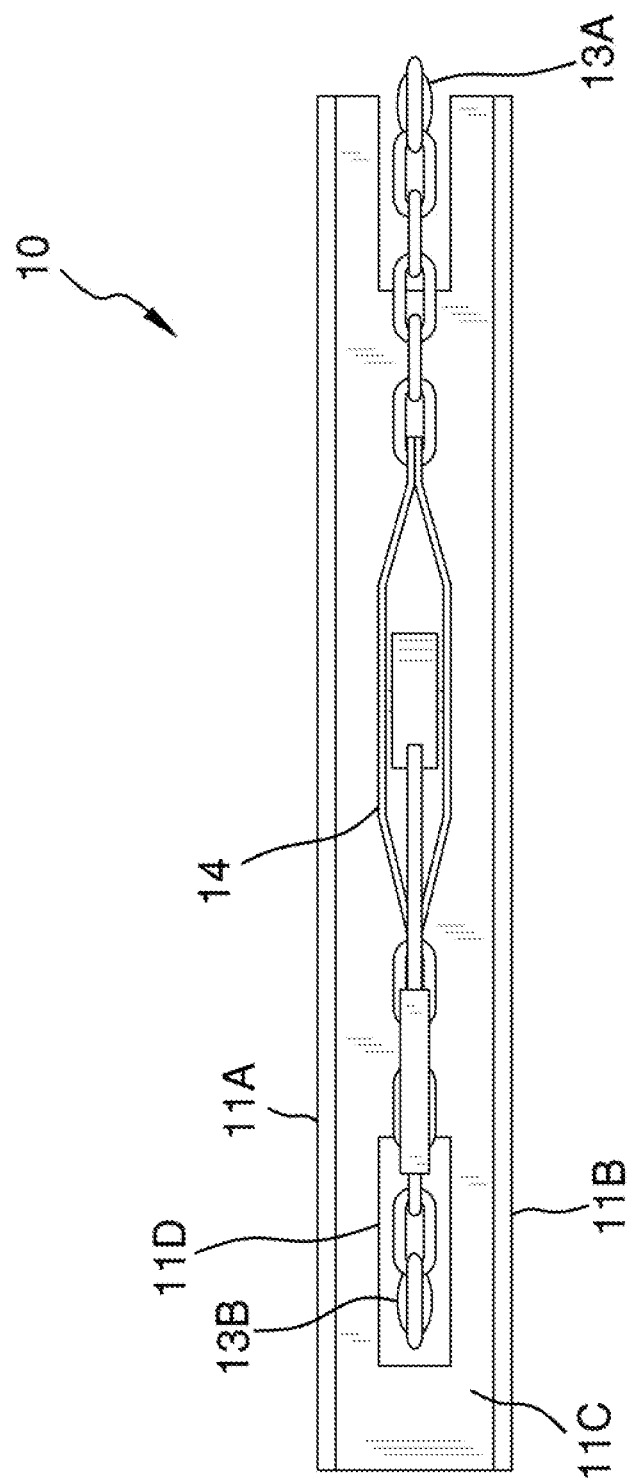
FIG. 5 illustrates a top view of the additional traction accessory for use with a continuous track by itself.
Figure 6:
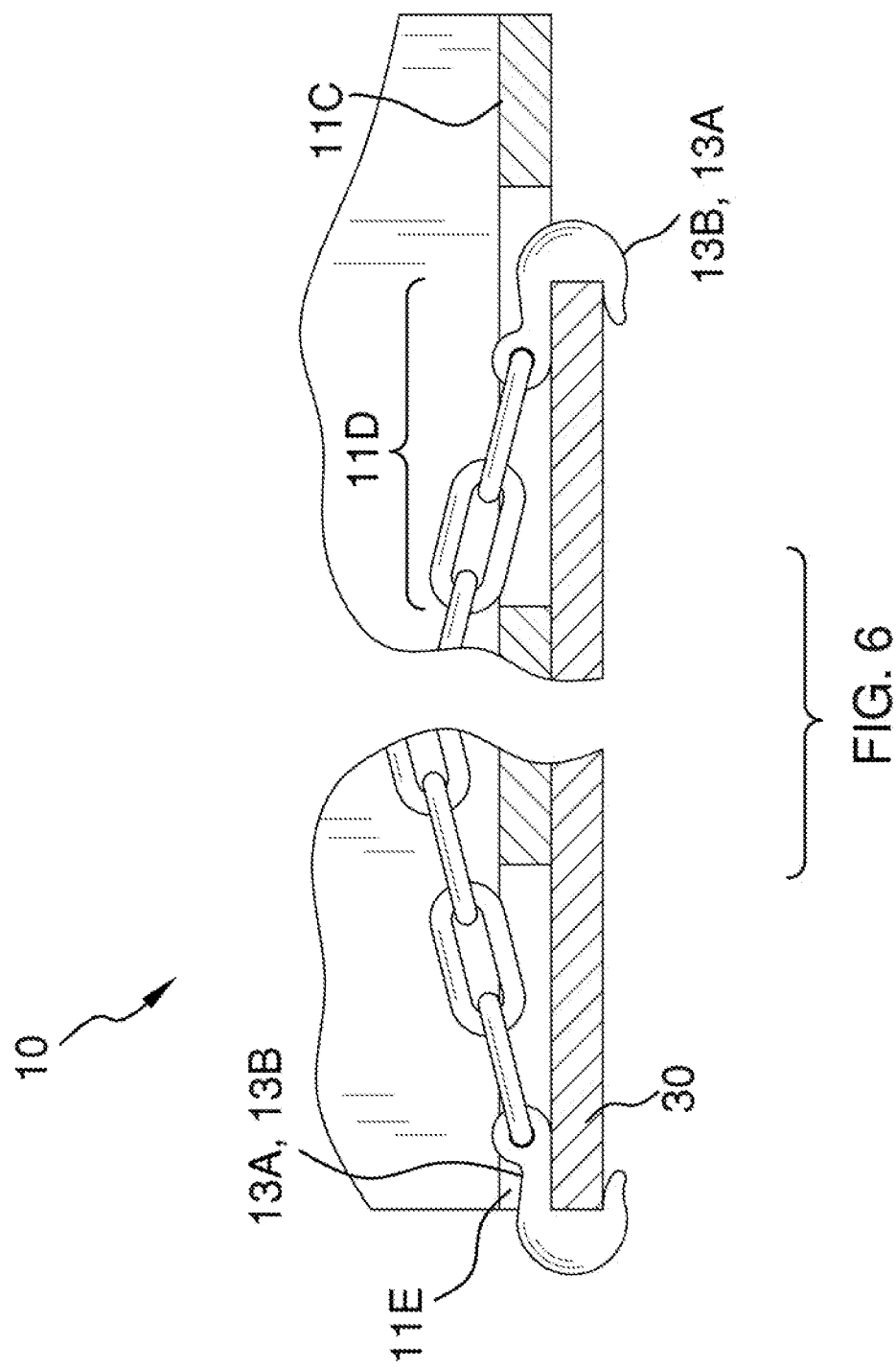
FIG. 6 illustrates a detailed cross-sectional view of the additional traction accessory for use with a continuous track, and detailing the inter-relation of the hooks attached to the continuous track.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. An additional traction accessory for use with a continuous track 10 (hereinafter invention) includes a U-shaped member 11 and an attaching means 12.

The U-shaped member 11 has a first side 11A, a second side 11B, and a bottom side 11C. The first side 11A is taller than the second side 11B. The bottom side 11C is bridged and connected to both the first side 11A and the second side 11B. The U-shaped member 11 has an overall length that is greater than the overall width of a continuous track 30. The continuous track 30 has a plurality of cleats 31. The first side 11A acts as a cleat, and has an overall height that is taller than the cleats 31 of the continuous track 30.

The attaching means 12 further comprises a pair of hooks 13 and a ratchet 14. The hooks 13 are each hooked onto an outer edge 30A of the continuous track 30. A first hook 13A is secured to the bottom side 11C and engages an inner side of the continuous track 30 that is closest to the vehicle. A second hook 13B extends from the ratchet by an undefined length of chain. The second hook 13B hooks onto an outer side of the continuous track 30 that is a side farthest from the vehicle. The U-shaped member 11 has a hole 11D located on the bottom side 11C that enables the second hook 13B to pass through the U-shaped member 11. The hole 11D enables proper securement of the invention 10 to the continuous track 30 as the overall length of the invention 10 is greater than the overall width of the continuous track 30.

The U-shaped member 11 includes an opening 11E located on the bottom side 11C that enables the first hook 13A to pass through the U-shaped member 11. The opening 11E, like the hole 11D, enables proper securement of the invention 10 to the continuous track 30.

It shall be noted that the invention 10 is installed between two consecutive cleats 31. It shall be further noted that a plurality of the invention 10 may be added onto the continuous track 30 at various locations.

The U-shaped member 11 and the attaching means 12 (the hooks 13 and the ratchet 14) are made of a material comprising a plastic, metal, or carbon fiber composite.

Referring to FIG. 1, the invention 10 is designed for use with a muddy surface 71.

Referring to FIGS. 7-12, an alternative embodiment 50 includes a slideable member 51 that extends and retracts from a stationary member 52. The slideable member 51 includes a slideable hook 51B whereas the stationary member 52 includes a stationary hook 52A. The slideable hook 51B hooks onto a side of the continuous track 30 whereas the stationary hook hooks onto an opposing side of the continuous track 30. It shall be noted that the stationary hook 52A does not extend or move whereas the slideable hook 51B can extend or retract from the alternative embodiment 50 (see FIG. 9). It shall also be noted that the hooks 51B and 52A can be rotated 180 degrees to hook onto the continuous track 30 in a backwards state as depicted and described above.

Figure 9:
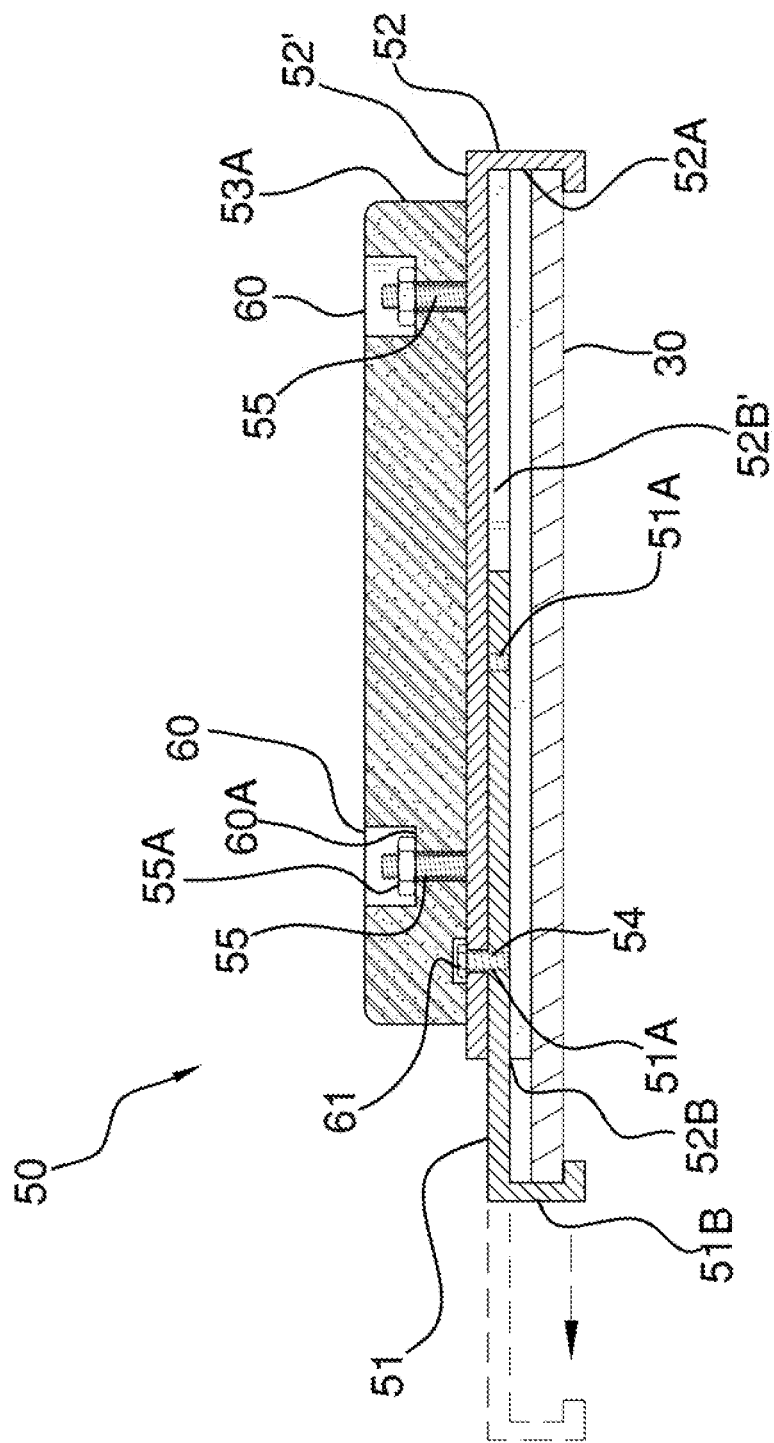
FIG. 9 illustrates a cross-sectional view of the alternative embodiment along line 9-9 in FIG. 8 and detailing movement of the slideable hook upon the continuous track as well as depicting the bolt for securing the slideable hook to a defined length as well as the rubber tread bolted to said embodiment.
Figure 10:
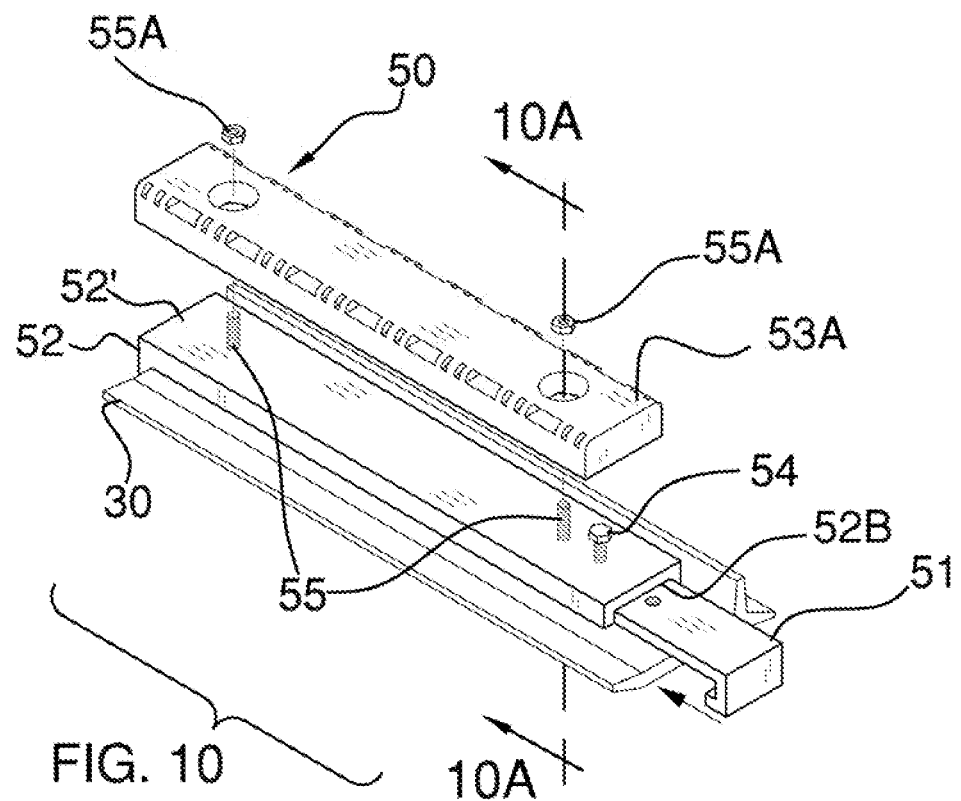
FIG. 10 illustrates an isometric view of the alternative embodiment with the rubber tread exploded from the assembly.
Figure 10A:
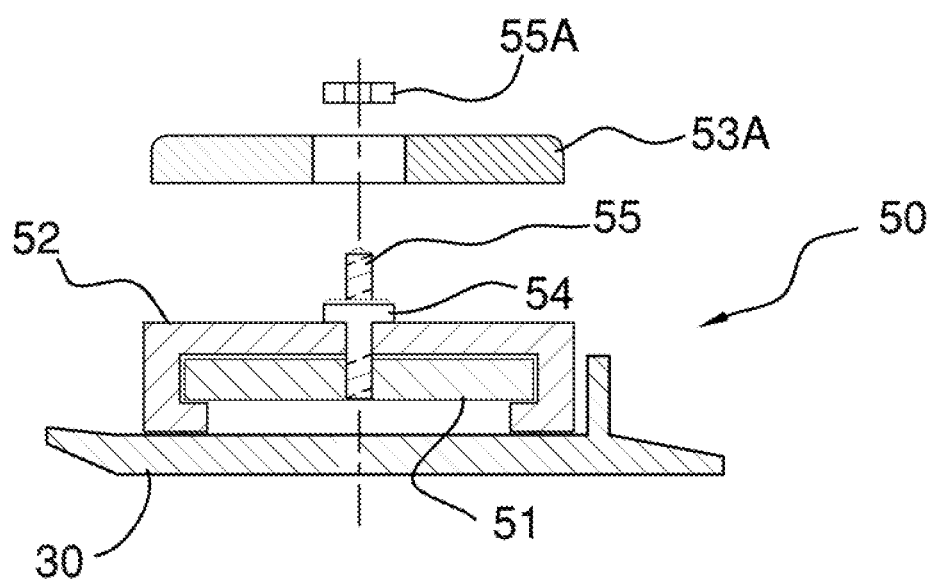
FIG. 10A illustrates a cross-sectional view of the alternative embodiment along line 10A-10A in FIG. 10 and further defining the track located in the stationary member.
Figure 11:
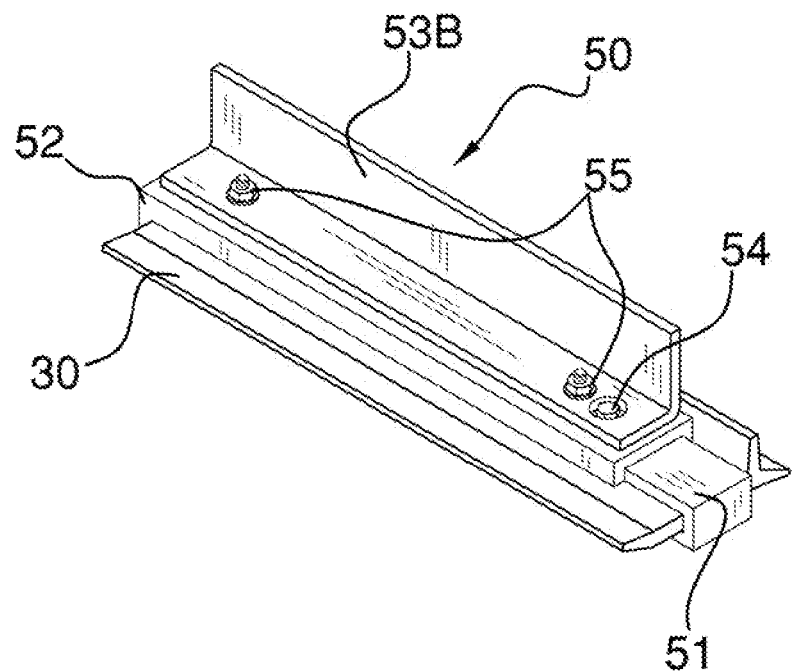
FIG. 11 illustrates an isometric view of the alternative embodiment with a cleat attached in place of the rubber tread.
Figure 12:
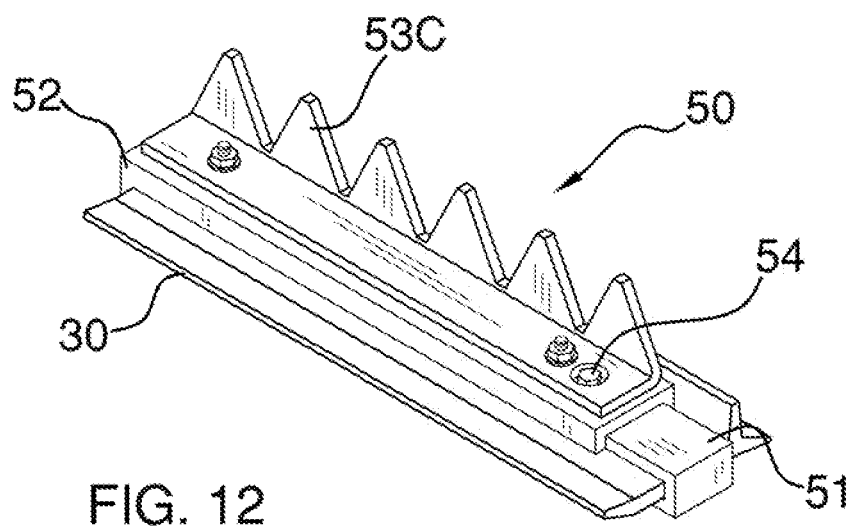
FIG. 12 illustrates an isometric view of the alternative embodiment with a teeth-styled cleat in place of the rubber tread.

Referring to FIGS. 9-10A, the slideable member 51 extends and retracts from an opening 52B located on the stationary member 52. The opening 52B forms a track 52B' that extends the entire length of the stationary member 52. The track 52B' has the same cross-section as the slideable member 51 such that the slideable member 51 does not become disengaged from the stationary member 52 while traversing therein.

The slideable member 51 locks in position with respect to the slideable member 52 via threaded holes 51A located on the slideable member 51 that align with a bolt 54 that traverses through the stationary member 52 and into one of the threaded holes 51A.

Attached upon the stationary member 52 is a rubber tread 53A. The rubber tread 53A attaches onto the stationary member 52 via bolts 55 that extend vertically from a top surface 52' of the stationary member 52 and of which secure the rubber tread 53A thereon via nuts 55A that screw onto said bolts 55. The rubber tread 53A includes holes 60 that enable the bolts 55 to pass there through. Each hole 60 includes a shoulder 60A that enables the nuts 55A to rest thereon. The rubber tread 53A includes a cavity 61 that accommodates the screw 54 to secure the slideable member 51 with respect to the stationary member 52.

The alternative embodiment 50 depicts the use of the rubber tread 53A. However, the alternative embodiment 50 may replace the rubber tread 53A with a cleat 53B or teeth 53C. The cleat 53B and the teeth 53C each include a hole 61 that acts as the cavity 61 defined above for the rubber tread 53A, but provides clearance for the bolt 54.

The cleat 53B acts as a cleat in that the alternative embodiment 50 adds a longer cleat to the continuous track 30 for use on muddy or swampy surfaces. The teeth 53C is essentially the cleat 53B with teeth formed thereon, and of which provides increased traction to the continuous track 30 for use on icy, wet, or frozen surfaces. Finally, it shall be noted that the rubber tread 53A, the cleat 53B, and the teeth 53C shall be referred to as a traction accessory. Furthermore, the traction accessory attaches onto the stationary member 52 of the alternative embodiment 50 via the bolts 55 and nuts 55A.

Figure 7:
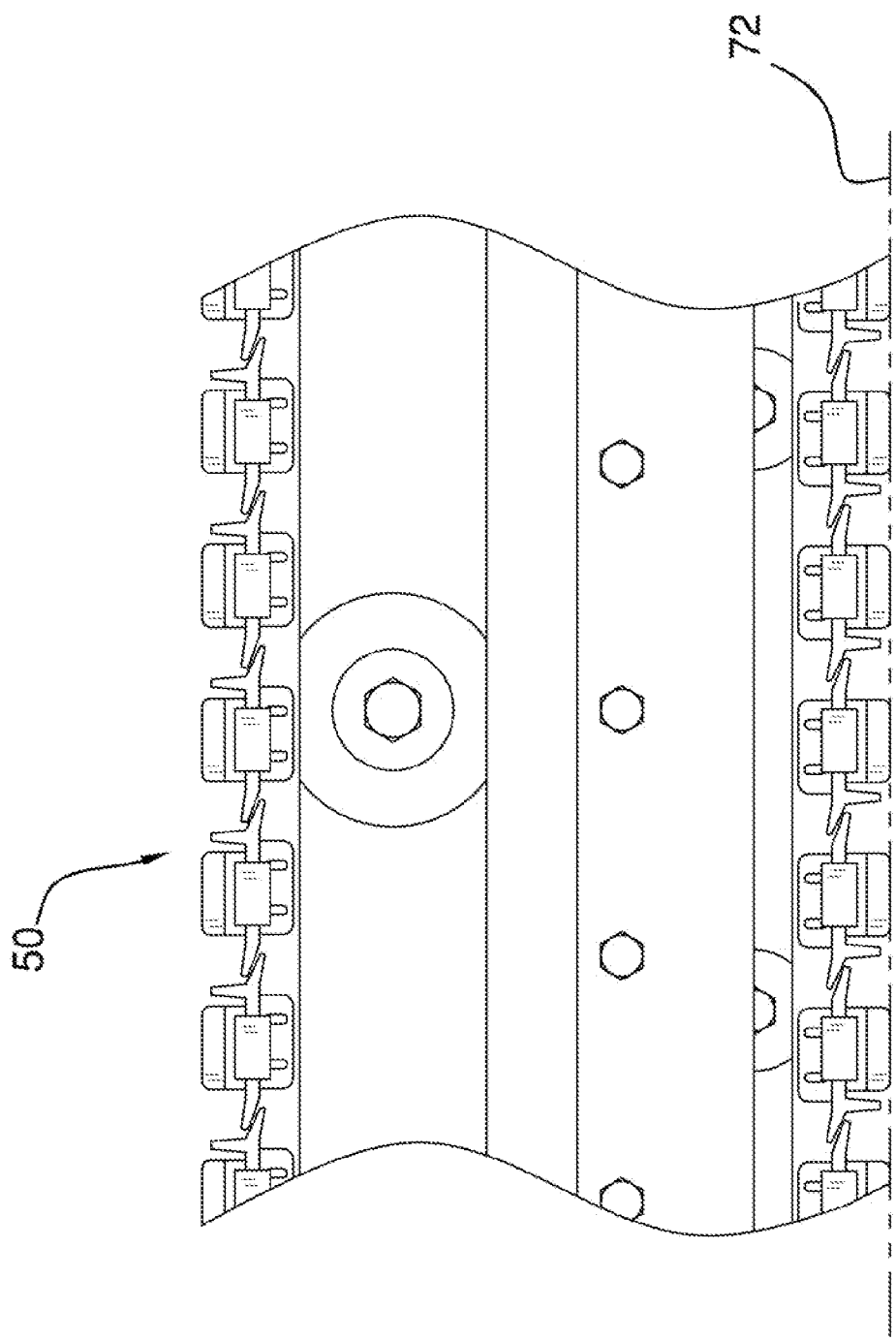
FIG. 7 illustrates a side view of an alternative embodiment attached onto each cleat of the continuous track and includes the slideable hooks and rubber tread.
Figure 8:
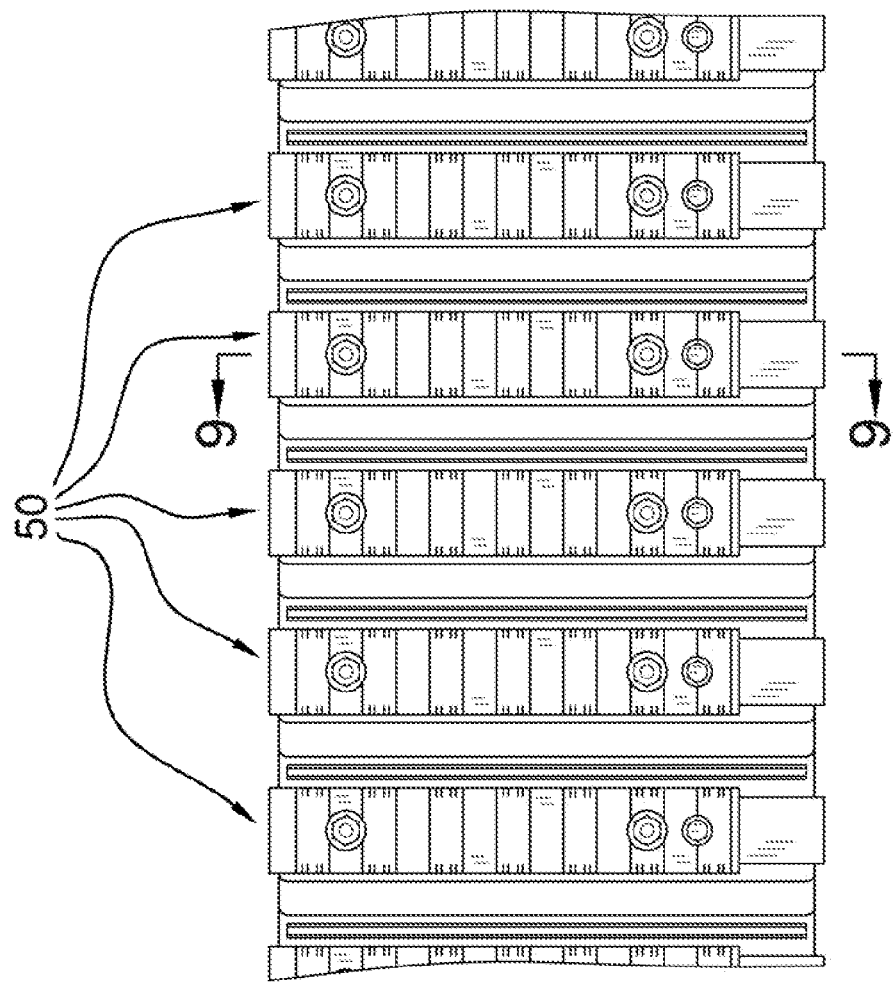
FIG. 8 a top view of the alternative embodiment attached onto multiple cleats of the continuous track.

Referring to FIG. 7, the rubber tread 53A of the alternative embodiment 50 is designed for use on paved or asphalt surfaces 72.

With respect to the above description, it is to be realized that the optimum dimensional relationship for the various components of the invention 10 and the alternative embodiment 50, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10 and the alternative embodiment 50.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A traction accessory for use with a continuous track comprising:
   a slideable member slideably engaged through a stationary member by a length defined by a bolt extending through said stationary member and into one of a plurality of threaded holes located upon predefined locations of said slideable member;
   wherein both the slideable member and the stationary member have hooks that hook upon sides of the continuous track; a plurality of bolts extend vertically from a top surface of said stationary member; and one of a rubber tread, cleat, and teeth being attached to said stationary member with said plurality of bolts.

2. The traction accessory as described in claim 1 wherein the stationary member features an opening that presents a track upon which the slideable member extends and retracts upon; and wherein the slideable member does not become disengaged from the stationary member while traversing upon said track.

3. The traction accessory as described in claim 1 wherein the treaded holes of the slideable member align with the bolt to extend or retract the slideable member for attachment of the traction accessory upon continuous tracks of varying widths.

4. The traction accessory as described in claim 1 wherein said one of the rubber tread, cleat, and teeth include holes that align with the plurality of bolts of the stationary member; wherein said each hole includes a shoulder that enables nuts to rest thereon.

5. The traction accessory as described in claim 1 wherein a plurality of accessories are attached at various locations on the continuous track to increase the overall traction of the continuous track.

6. The traction accessory as described in claim 1 wherein the rubber tread is for use in providing traction to asphalt; the cleat is for use in providing traction to muddy surfaces; and the teeth is for use in providing traction to icy or frozen surfaces.

\* \* \* \* \*